(12) United States Patent
Pan et al.

(10) Patent No.: US 10,789,734 B2
(45) Date of Patent: Sep. 29, 2020

(54) METHOD AND DEVICE FOR DATA QUANTIZATION

(71) Applicant: VIA Alliance Semiconductor Co., Ltd., Shanghai (CN)

(72) Inventors: Jie Pan, Beijing (CN); Xu Wang, Beijing (CN)

(73) Assignee: VIA ALLIANCE SEMICONDUCTOR CO., LTD., Shanghai (CN)

(*) Notice: Subject to any disclaimer, the term of this patent is extended or adjusted under 35 U.S.C. 154(b) by 622 days.

(21) Appl. No.: 15/673,758

(22) Filed: Aug. 10, 2017

(65) Prior Publication Data

US 2018/0350109 A1 Dec. 6, 2018

(30) Foreign Application Priority Data

Jun. 6, 2017 (CN) .......................... 2017 1 0417999

(51) Int. Cl.
*G06T 9/00* (2006.01)
*G06K 9/62* (2006.01)
*H04N 19/172* (2014.01)
*H04N 19/126* (2014.01)

(52) U.S. Cl.
CPC ............ *G06T 9/002* (2013.01); *G06K 9/6262* (2013.01); *H04N 19/126* (2014.11); *H04N 19/172* (2014.11)

(58) Field of Classification Search
None
See application file for complete search history.

(56) References Cited

U.S. PATENT DOCUMENTS 10,417,525 B2 * 9/2019 Ji .......................... G06K 9/4628
2016/0328646 A1 * 11/2016 Lin .......................... G06N 3/08

OTHER PUBLICATIONS

Hwang, K., et al.; "Fixed-Point Feedforward Deep Neutral Network Design Using Weights +1, 0, and −1;" IEEE Xplore Digital Library; Dec. 2014; pp. 1-7.
Darryl D et al.; "Fixed Point Quantization of Deep Convolutional Networks," Published on Nov. 19, 2015 in San Diego, CA, Qualcomm Research, pp. 1-12.

* cited by examiner

*Primary Examiner* — Michael D. Yaary
(74) *Attorney, Agent, or Firm* — McClure, Qualey & Rodack, LLP

(57) ABSTRACT

A method for data quantization is provided. The method includes: receiving data to be quantized; calculating a quantization parameter according to a distribution of the data to be quantized; iteratively calculating an optimal quantization step size according to the quantization parameter and the data to be quantized; and quantizing the data to be quantized according to the optimal quantization step size to obtain quantization data.

12 Claims, 6 Drawing Sheets

US 10,789,734 B2

METHOD AND DEVICE FOR DATA QUANTIZATION

CROSS REFERENCE TO RELATED APPLICATIONS

This application claims priority to Chinese Patent Application No. 201710417999.3 filed on Jun. 6, 2017 in the China Intellectual Property Office, the contents of which are incorporated by reference herein.

BACKGROUND OF THE INVENTION

Field of the Invention

Aspects of the present disclosure relate generally to the field of neural networks, and more particularly, to a method and a device for data quantization.

Description of the Related Art

The term "neural network" refers to a computational architecture modeled after biological brains. Within a neural network, nodes referred to as neurons may be interconnected and operate collectively to process input data. Examples of different types of neural networks include, but are not limited to, Convolutional Neural Networks, Recurrent Neural Networks, and Deep Belief Networks.

Convolutional neural networks are neural networks that include one or more convolutional layers. Convolutional layers are generally sparsely-connected neural network layers. That is, each node in a convolutional layer receives an input from a portion of the nodes in the neural network layer and generates an activation based on the input. Generally, convolutional layers have nodes that generate an activation by convolving received inputs in accordance with a set of weights for each node. In some cases, nodes in a convolutional layer may be configured to share weights. That is, all of or a portion of the nodes in the layer may be constrained to have the same weight values as the other nodes in the layer. Convolutional layers are generally considered to be well suitable for processing images, and are ideal for use in such fields as image recognition, because of their ability to extract features from an input image.

However, it is difficult for the general computer system to effectively execute calculations because of the huge computation and storage capacity in convolutional neural networks. Therefore, it is urgent to solve the problems of how to improve computation speed and accuracy in convolutional neural networks and how to reduce storage space.

BRIEF SUMMARY OF THE INVENTION

The following summary is illustrative only and is not intended to be limiting in any way. That is, the following summary is provided to introduce concepts, highlights, benefits, and advantages of the novel and non-obvious techniques described herein. Select, not all, implementations are described further in the detailed description below. Thus, the following summary is not intended to identify essential features of the claimed subject matter, nor is it intended for use in determining the scope of the claimed subject matter.

A method and a device for data quantization are provided in the disclosure.

A method for data quantization is disclosed in the disclosure, which may be implemented in a processor, comprising: receiving data to be quantized; calculating a quantization parameter according to a distribution of the data to be quantized; iteratively calculating an optimal quantization step size according to the quantization parameter and the data to be quantized; and quantizing the data to be quantized according to the optimal quantization step size to obtain quantization data.

A device for data quantization is disclosed in the disclosure. The device comprises one or more processors and one or more computer storage media for storing one or more computer-readable instructions, wherein the processors may be configured to drive the computer storage media to execute the following tasks: receiving data to be quantized; calculating a quantization parameter according to a distribution of the data to be quantized; iteratively calculating an optimal quantization step size according to the quantization parameter and the data to be quantized; and quantizing the data to be quantized according to the optimal quantization step size to obtain quantization data.

BRIEF DESCRIPTION OF THE DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It should be appreciated that the drawings are not necessarily to scale as some components may be shown out of proportion to the size in actual implementation in order to clearly illustrate the concept of the present disclosure.

DETAILED DESCRIPTION OF THE INVENTION

Figure 1:
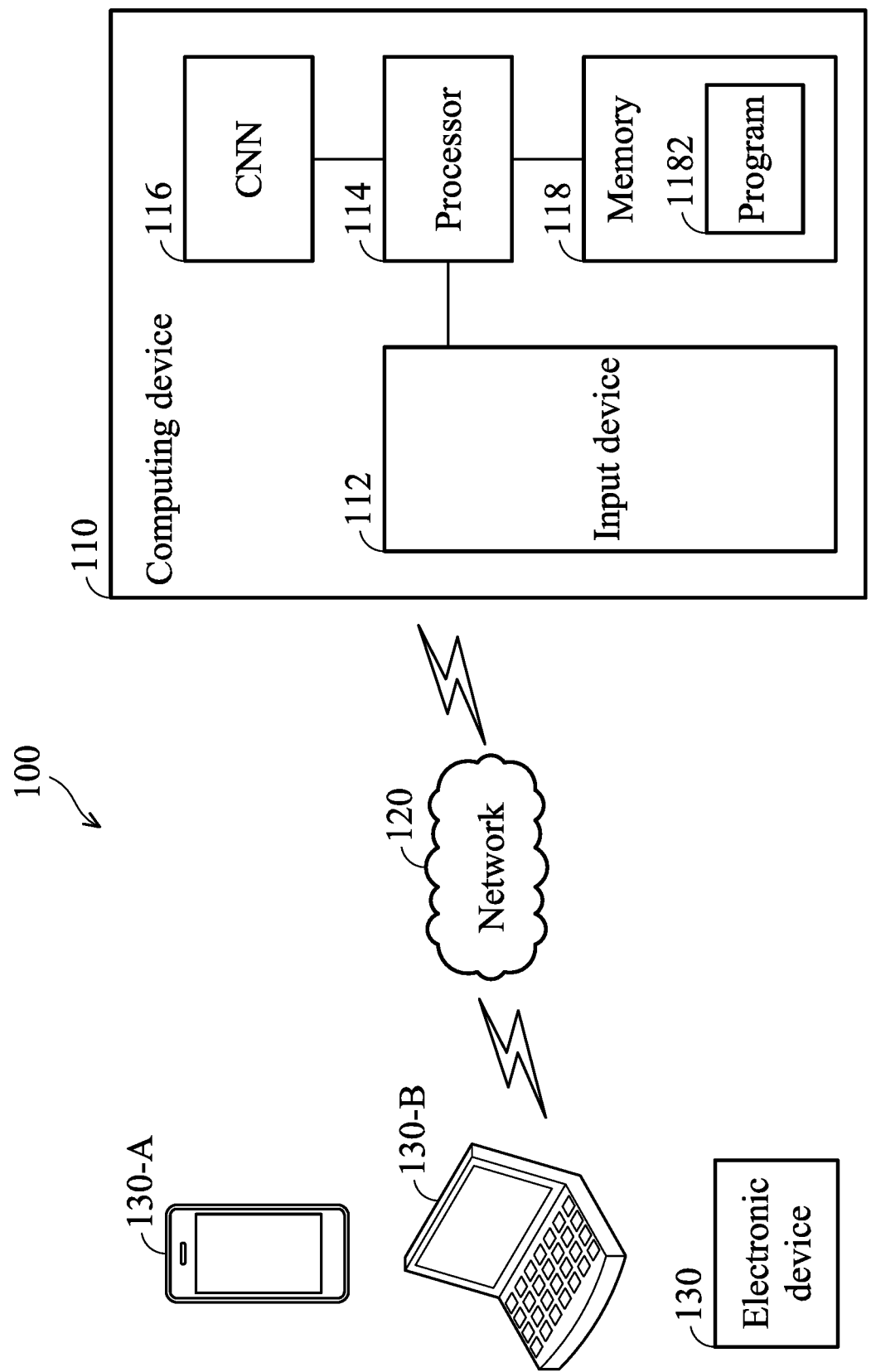
FIG. 1 shows a schematic diagram of a system of a convolutional neural network according to one embodiment of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Neural networks are useful for a variety of complicated computation tasks. Types of neural networks include: neural networks with only one or two layers of single direction logic, with complicated multi-input, multi-directional feedback loops and layers. Generally, these systems use algorithms in their programming to determine control and organization of their functions. Most systems use "weights" (which can be expressed as values) to change the parameters of the throughput and the varying connections to the neurons. Neural networks can be autonomous and learn from prior training accomplished through the use of sets of training data.

In order to provide some context for the teachings herein, some aspects are now introduced.

As discussed herein, the term "neural network" generally refers to statistical learning algorithms having an adaptive nature and is therefore useful in machine learning. The neural network may include a plurality of artificial nodes, known as "neurons," "processing elements," "units," or by other similar terms and which are connected together to form a network which mimics a biological neural network. Generally, a neural network includes sets of adaptive weights (i.e. numerical parameters that are tuned by a learning algorithm), and are capable of approx$_i$ mating non-linear functions of their inputs. The adaptive weights are conceptually connection strengths between neurons, which are activated during training and prediction. Generally, a neural network operates on a principle of non-linear, distributed, parallel and local processing and adaptive.

In general, the term "convolutional neural network" is a type of feed-forward artificial neural network where the individual neurons are tiled in such a way that they respond to overlapping regions in the visual field. Convolutional networks are variations of multilayer perceptrons (MLP) and are designed to use minimal amounts of preprocessing. When used for image recognition, a convolutional neural network uses multiple layers of small neuron collections which look at small portions of the input image, called "receptive fields." The results of these collections are then tiled so that they overlap to obtain a better representation of the original image. This is repeated for every such layer.

In addition to the image data, the input of each layer further includes a weight parameter and a bias parameter. The result of the convolution operation performed on the image data with the weight parameter is added to the bias parameter to obtain an output of the layer, wherein the weight parameter and the bias parameter of each layer may be different.

The term "application" as used herein is intended to encompass executable and non-executable software files, raw data, aggregated data, patches, and other code segments. Furthermore, like numerals refer to like elements throughout the several views, and the articles "a" and "the" includes plural references, unless otherwise specified in the description.

FIG. 1 shows a schematic diagram of a system 100 of convolutional neural network according to one embodiment of the present disclosure. The system 100 of convolutional neural network may include a computing device 110 and an electronic device 130 connected to the network 120.

The computing device 110 may include an input device 112, wherein the input device 112 is configured to receive input data from a variety of sources. For example, the computing device 110 may receive image data from the network 120 or receive data transmitted by the electronic device 130.

The computing device 110 may include a processor 114, a convolutional neural network (CNN) 116 and a memory 118 which may store program 1182. In addition, the data may be stored in the memory 118 or stored in the convolutional neural network 116. In one embodiment, the convolutional neural network 116 may be implemented in the processor 114. In another embodiment, the computing device 110 may be used with components, systems, subsystems, and/or devices other than those that are depicted herein.

The types of electronic device 130 that can utilize the computing device 110 range from small handheld devices, such as a mobile telephones 130-A and a handheld computers 130-B to large mainframe systems, such as mainframe computers. Examples of handheld computers 130 include personal digital assistants (PDAs) and notebooks. The electronic device 130 can be connected to the computing device 110 by using a network 120. The network 120 can include, but is not limited to, one or more local area networks (LANs), and/or wide area networks (WANs).

It should be understood that the computing device 110 and the electronic device 130 shown in FIG. 1 is an example of one suitable system 100 architecture for a convolutional neural network. Each of the components shown in FIG. 1 may be implemented via any type of computing device, such as the computing device 600 described with reference to FIG. 6, for example.

Figure 2:
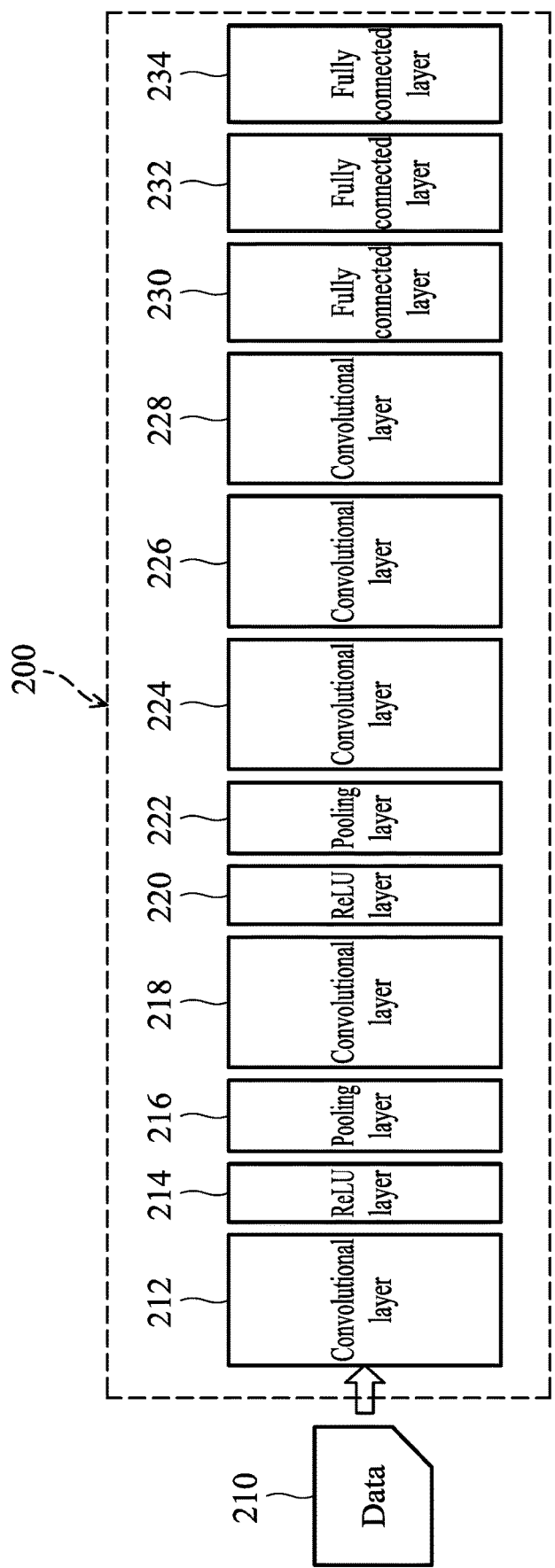
FIG. 2 shows a schematic diagram of a convolutional neural network according to one embodiment of the present disclosure.

FIG. 2 shows a schematic diagram of a convolutional neural network 200 according to one embodiment of the present disclosure. Data 210 is input into the convolutional neural network 200. The data 210 is, for example, image data, such as 224×224 pixel gray scale image. The convolutional neural network 200 may include five convolutional layers, which are convolutional layers 212, 218, 224, 226, 228 and the other three layers may be fully connected layers 230, 232, 234.

In some embodiments, a rectified linear (ReLU) layer 214 and a pooling layer 216 may be inserted between the convolutional layer 212 and the convolutional layer 218. In another embodiment, the ReLU layer 214 and the ReLU layer 220 may be implemented by using a Signoid function or a Tan h function. The pooling layer 216 and the pooling layer 222 may be implemented by using max pooling method or a mean pooling method.

To improve the computational accuracy of the convolutional neural network, as well as to improve calculation speed and reduce storage capacity, embodiments of the disclosure first determine an optimal quantization step size according to data, wherein the data format of the data is a floating-point format. The optimal quantization step size is used to determine the fixed-point format of a fixed point. Then, fixed-point processing to the data to be quantized is performed using the fixed-point format to obtain fixed-point numbers, which is more accurate than other fixed-point numbers obtained from other fixed-point processing methods. Furthermore, embodiments of the present disclosure propose that, start from the second convolutional layer, an optimal quantization step size may be determined based on the output data of the previous convolutional layer and the fixed-point processing to the output data of the previous convolutional layer is performed by using the optimal quantization step size to obtain the fixed-point data to be input into the next convolutional layer. Therefore, the calculation speed of the convolutional neural network can be further improved and the cost can be reduced.

Figure 3:
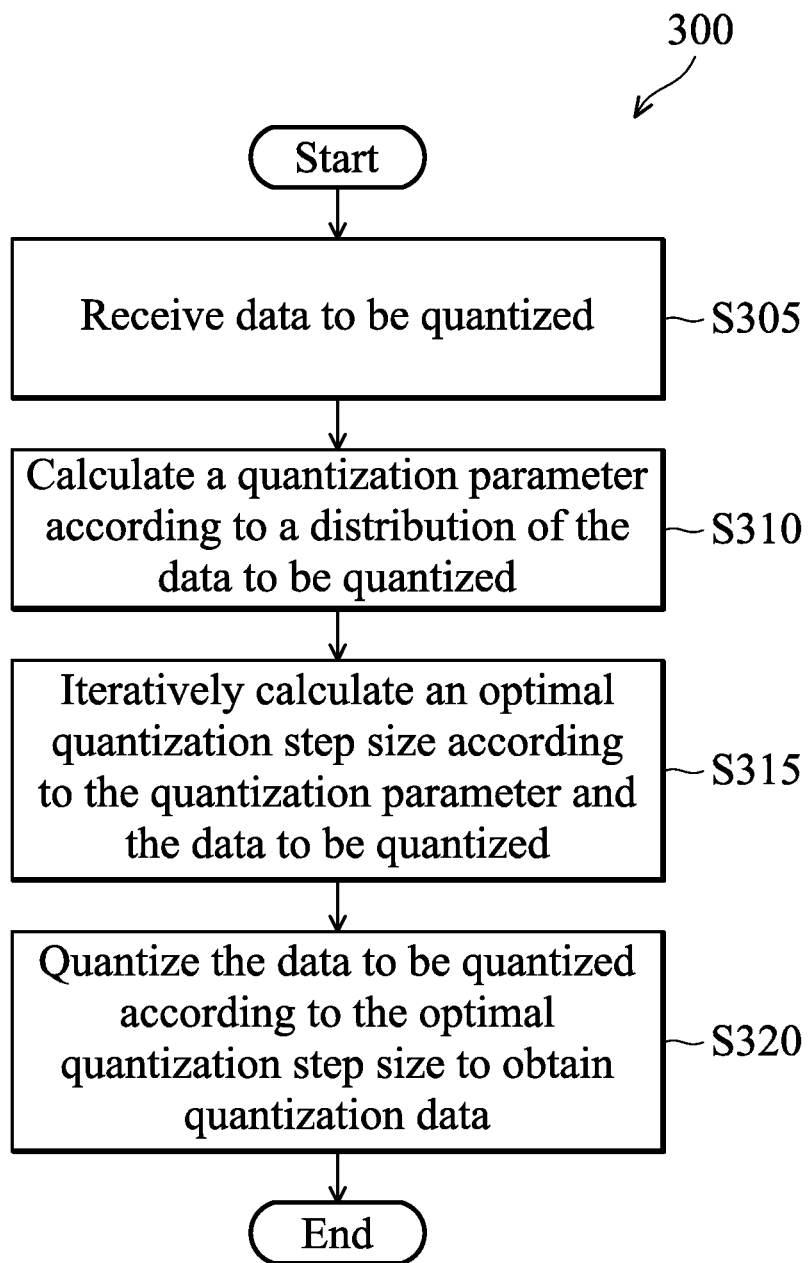
FIG. 3 is a flow diagram illustrating a method for optimization of quantization step size in a convolutional neural network according to an embodiment of the disclosure.

FIG. 3 is a flow diagram 300 illustrating a method for optimization of quantization step size in a convolutional neural network according to an embodiment of the disclosure.

In step S305, the computing device receives data to be quantized, wherein the data to be quantized are floating-point numbers. In step S310, the computing device calculates a quantization parameter according to a distribution of the data to be quantized. In step S315, the computing device iteratively calculates an optimal quantization step size according to the quantization parameter and the data to be quantized. In step S320, the computing device quantizes the data to be quantized according to the optimal quantization step size to obtain quantization data.

In the present disclosure, two ways of optimizing quantization step size are provided, and both described below.

Manner I

In some embodiments, the distribution of the data to be quantized may be like a Gaussian distribution, a mean $\mu$ and a variance a for the distribution of the data to be quantized can be calculated according to the distribution. A quantization parameter can be calculated according to the mean $\mu$, the variance a and an adjustment function, for example, quantization parameter an initial quantization step size $\Delta^0$, wherein the adjustment function can be derived by the following equations:

$$\Delta^0 = \sigma' \times C_{scaling}(\omega) \times \alpha \qquad (1)$$

$$\sigma' = |\mu| + \sigma \text{ or } \sigma' = \sigma \text{ or } \sigma' = \sqrt{\mu^2 + \sigma^2} \qquad (2)$$

$$\Delta^0 = \sigma' \times C_{scaling}(\omega) \qquad (3)$$

where $C_{scaling}(\omega)$ is an adjustment function, and a and the bit length co of the data to be quantized are adjustable parameters. The bit length co of the data to be quantized is same as the bitwidth of the data to be quantized.

The optimal quantization step size can be determined when a quantization error function is minimized. The quantization error function E can be expressed by the following equation:

$$E = \tfrac{1}{2}\Sigma_{i=1}^{N}(Q(x_i)-x_i)^2 = \tfrac{1}{2}\Sigma_{i=1}^{N}(\Delta \cdot g(x_i)-x_i)^2 = \tfrac{1}{2}\Sigma_{i=1}^{N}(\Delta \cdot z_i - x_i)^2 \qquad (4)$$

where $Q(x_i)$ is the quantized data, $x_i$ is the data to be quantized, N is the number of is $x_i$, and $\Delta$ is the optimal quantization step size. The optimal quantization step size is obtained by iteratively using the initial quantization step size $\Delta^0$ and the quantization error function. The iterative process can be expressed by the following equation:

$$z^{(t)} = \operatorname{argmin}_z E(x, z, \Delta^{(t-1)}) \qquad (5)$$

$$\Delta^{(t)} = \operatorname{argmin}_\Delta E(x, z^{(t)}, \Delta) = \frac{\sum_{i=1}^{N} x_i z_i^{(t)}}{\sum_{i=1}^{N} (z_i^{(t)})^2}. \qquad (6)$$

Specifically, after the initial quantization step size $\Delta^0$ is determined, $z^{(1)}$ is obtained by the equation (5) when the quantization error function E is minimum. After $z^{(1)}$ is determined, $\Delta^{(1)}$ is obtained by the equation (6) when the quantization error function E is minimum, and so on, so that the optimal quantization step size $\Delta$ can be finally obtained when the quantization error function E is minimized. The relationship between $Q(x_i)$ and $z_i$ is expressed by the following equation:

$$Q(x_i) = \Delta \cdot z_i \qquad (7)$$

$$z_i = g(x_i). \qquad (8)$$

When the quantization level M is even, $g(x_i)$ can be expressed as:

$$g(x_i) = \operatorname{slop}(x_i) \cdot \min\left\{\operatorname{floor}\left(\frac{|x_i|}{\Delta}\right) + 0.5, \frac{M-1}{2}\right\}. \qquad (9)$$

When the quantization level M is odd, $g(x_i)$ can be expressed as:

$$g(x_i) = \operatorname{slop}(x_i) \cdot \min\left\{\operatorname{floor}\left(\frac{|x_i|}{\Delta} + 0.5\right), \frac{M-1}{2}\right\}, \qquad (10)$$

where $\operatorname{slop}(x_i)$ of $g(x_i)$ can be expressed as:

$$\operatorname{slop}(x_i) = \begin{cases} 1, & x_i \geq 0 \\ -1, & x_i < 0 \end{cases}.$$

Manner I is an example of uniform quantization methods, in Manner I, the relationship between the quantization level M and the bit length co is $M \leq 2^\omega$, wherein the quantization level M may be odd or even, and the relationship between the adjustment function $C_{scazing}(\omega)$ and the bit length co is expressed in Table 1.

TABLE 1

Uniform Quantizer according to Gaussian distribution

| | $\omega$ | | | | | | | |
| --- | --- | --- | --- | --- | --- | --- | --- | --- |
| | 1 | 2 | 3 | 4 | 5 | 6 | 7 | 8 |
| $C_{scaling}(\omega)$ | 1.596 | 0.996 | 0.586 | 0.335 | 0.188 | 0.104 | 0.057 | 0.031 |

After the optimal quantization step size is obtained, the fixed-point format of the data to be quantized can be obtained by the optimal quantization step size. The fixed-point format includes a number of bits for a sign part, a number of bits for an integer part m and a number of bits for a fraction part n, wherein the number of bits for a sign part may be 1. In some cases, when the value of the data to be quantized is positive, the bit for the sign part of the data to be quantized is set as 0. When the value of data to be quantized is negative, the bit for the sign part of the data to be quantized is set as 1. The number of bits for an integer part m and the number of bits a fraction part n can be expressed by the following equations:

$$m = \log_2(\text{Range}/2), \text{ wherein Range} = (M-1) \times \Delta \quad (11)$$

$$n = -\log_2(\Delta) \quad (12)$$

Manner II

Manner II can be implemented by means of a non-uniform quantization method and a uniform quantization method.

Non-uniform Quantization Method

A quantization parameter $x_a$ is estimated using the distribution $p(x)$ of the data to be quantized, wherein the relationship between the distribution of the data to be quantized and the quantized data can be expressed by the following equation:

$$\hat{x}_q = \frac{\int_{b_{q-1}}^{b_q} xp(x)dx}{\int_{b_{q-1}}^{b_q} xp(x)dx}, \quad (13)$$

where $b_q$ is the decision boundary, and the relationship between $b_q$, $\hat{x}_q$ and $\hat{x}_{q+1}$ can be expressed as $b_q = \frac{1}{2}(\hat{x}_q + \hat{x}_{q+1})$.

Then, an error minimum value θ between the quantization parameter $\hat{x}_1$ and the data to be quantized can be iteratively found based on the quantization parameter $\hat{x}_q$, wherein the error minimum value θ can be expressed by the following equation:

$$\theta = \hat{x}_q - \frac{\int_{b_{q-1}}^{b_q} xp(x)dx}{\int_{b_{q-1}}^{b_q} xp(x)dx}. \quad (14)$$

When q is the quantization level M and the error minimum value θ is less than a threshold, the shortest quantization step size Δmin in can be determined, wherein the shortest quantization step size Δmin is the optimal quantization step size.

Uniform Quantization Method

When the quantization level M is much larger than 2, the relationship between $b_q$, and $x_a$ can be expressed by the following equation:

$$\hat{x}_{q+1} = \frac{1}{2}(b_q + b_{q+1}). \quad (15)$$

The quantization parameter $\hat{x}_{q+1}$ can be used to iteratively find the error minimum value θ to obtain the optimal quantization step size.

After the optimal quantization step size is obtained by means of manner II, the fixed-point format of the data to be quantized can be obtained according to the optimal quantization step size. The fixed-point format of the data to be quantized when using non-uniform quantization is shown in Table 2.

TABLE 2

| Bit of sign part | It is the same as the bit of sign part of the floating point number |
|---|---|
| Number of bits for a fraction part n | n = −log₂(Δmin), Δmin is the optimal quantization step size |
| Number of bits for an integer part m | M = P − 1 − n, P is the number of bits of the data to be quantized |

The fixed-point format of the data to be quantized when uniform quantization is used is shown in Table 3.

TABLE 3

| Bit of sign part | It is the same as the bit of sign part of the floating point number |
|---|---|
| Number of bits for a fraction part n | n = −log₂(Δ), Δmin is the optimal quantization step size |
| Number of bits for an integer part m | m = log₂(max\|Q₀\|, \|Q_M\|); Q₀ is the initial quantization position, Q_M is the final quantization position, M is the quantization level |

Figure 4:
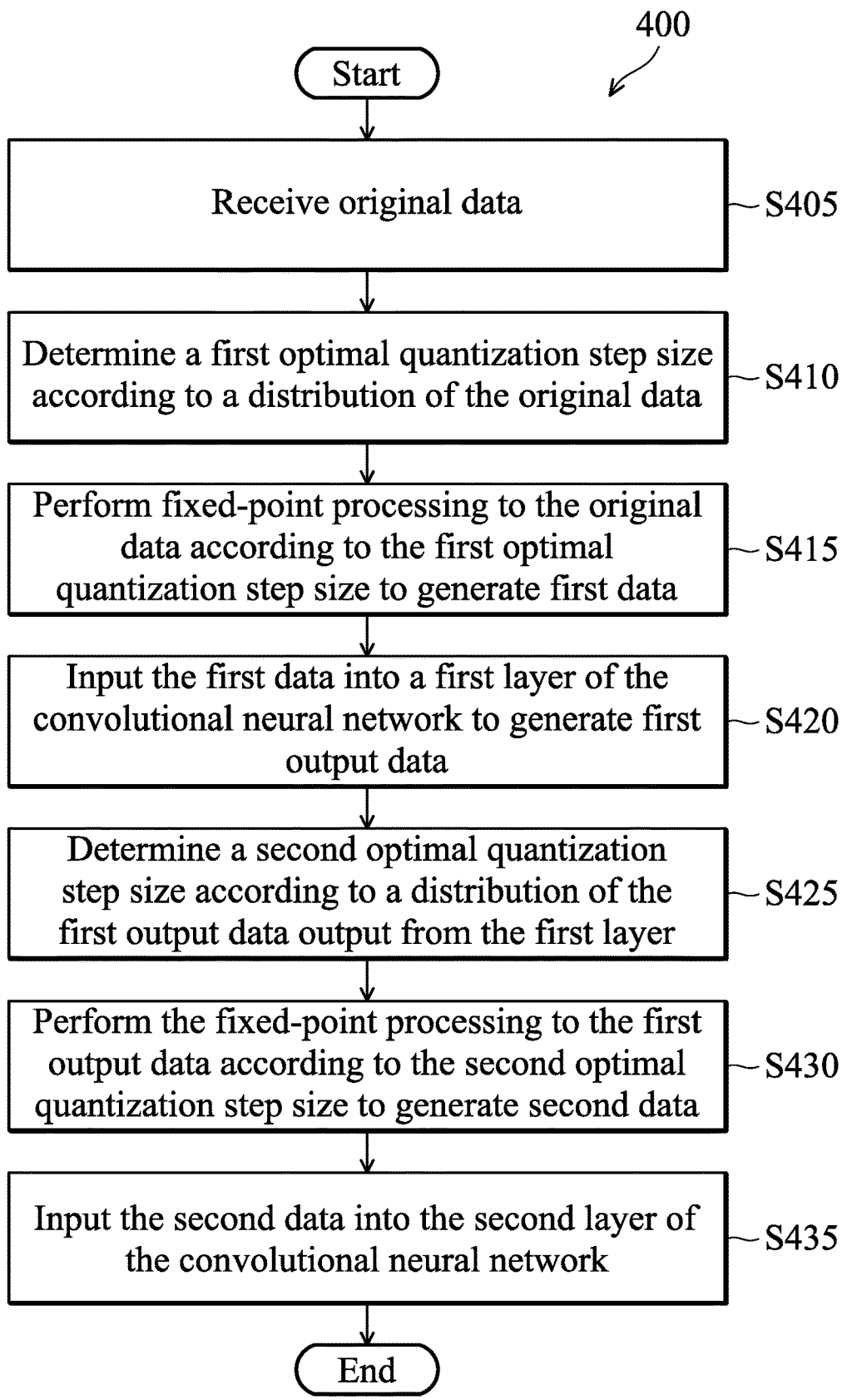
FIG. 4 is a flow diagram illustrating a computation method used in a convolutional neural network according to an embodiment of the disclosure.

FIG. 4 is a flow diagram 400 illustrating a computation method used in a convolutional neural network according to an embodiment of the disclosure. The method can be implemented by the computing device as shown in FIG. 1.

In step S405, the computing device receives original data, wherein the data format of the original data can be a floating-point format, and the original data may include original image data. In some embodiments, the original data may further comprise original weight data and/or original bias data. In step S410, the computing device determines a first optimal quantization step size according to a distribution of the original data. In step S415, the computing device determines a first fixed-point format of the original data according to the first optimal quantization step size, and performs fixed-point processing to the original data according to the first optimal quantization step size to generate first data. In step S420, the computing device uses the first data as an input to a first layer of the convolutional neural network to generate first output data, wherein the first data may include first image data, first weight data and/or first bias data, and the data format of the first output data is the floating-point format. In step S425, the computing device determines a second optimal quantization step size according to a distribution of the first output data output from the first layer. In step S430, the computing device performs the fixed-point processing to the first output data according to the second optimal quantization step size to generate second data, wherein the second data may include second image data, second weight data and/or second bias data. A second fixed-point format of the first output data may be determined according to the second optimal quantization step size, and then the fixed-point processing to the first output data is performed according to the second optimal quantization step size to generate second image data. In step S435, the second data is input into the second layer of the convolutional neural network, wherein the first layer and the second layer may be convolutional layers of the convolutional neural network.

In one embodiment, the fixed-point processing to the second weight data and/or the second bias data may be performed, and the fixed-point format used in the fixed-point processing can be determined according to manner I and manner II provided in the disclosure. In one embodiment, the second weight data and/or the second bias data may be the data without fixed-point processing. In one embodiment, the first optimal quantization step size may be different from the second optimal quantization step size, and the first fixed-point format may be different from the second fixed-point format. For example, the uniform quantization method used in manner I disclosed in the disclosure may be used to generate the first fixed-point format, and the fixed-point processing to the original data may be performed using the first fixed-point format. The first weight data and the first bias data in step S420 are the data that has been performed fixed-point processing, wherein the fixed-point format used in step S420 may be determined according to manner I or manner II disclosed in the present disclosure. For example, the fixed-point format may be determined using the non-uniform quantization method in manner II disclosed in the disclosure. In other words, the fixed-point formats used for the image data, the weight data, and the bias data input to each convolutional layer of the convolutional neural network may be the same or different, and the manners for determining the fixed-point format may also be the same or different. FIG. 4 is merely an embodiment of the present disclosure, and the embodiment merely shows the input and/or output of two neural network layers of the convolutional neural network. In some embodiments, the convolutional neural network may include a plurality of neural network layers, and each of neural network layer may include a convolutional layer, a ReLU layer, and/or a pooling layer. For example, after the computing device obtains the first output data, the first output data may be input to a rectified linear (ReLU) layer and/or a pooling layer to obtain subsequent first output data. In other words, in step S425, the computing device may determine the second optimal quantization step size according to a distribution of the subsequent first output data.

In an embodiment, the first optimal quantization step size and/or the second optimal quantization step size may be determined offline. In another embodiment, the step of determining the fixed-point formats for the image data, the weight data and/or the bias data input to each convolutional layer of the convolutional neural network and/or the step of performing the fixed-point processing to the image data, the weight data and/or the bias data can be performed offline. In other words, the step of determining the fixed-point format and/or the fixed-point processing may be performed in a computing unit which may be installed outside the computing device. For example, the original image data, the original weight data, the original bias data, and/or the first output data may be transferred to and/or stored in a computing unit of an electronic device. The computing unit determines the fixed-point formats and performs the fixed-point processing to obtain corresponding first image data, first weight data, first bias data, and/or second image data. In some embodiments, the original weight data and/or the original bias data may be directly input to the first convolutional layer without fixed-point processing to the original weight data and/or the original bias data. In other words, the first weight data is the original weight data, and the first bias data is the original bias data.

Figure 5:
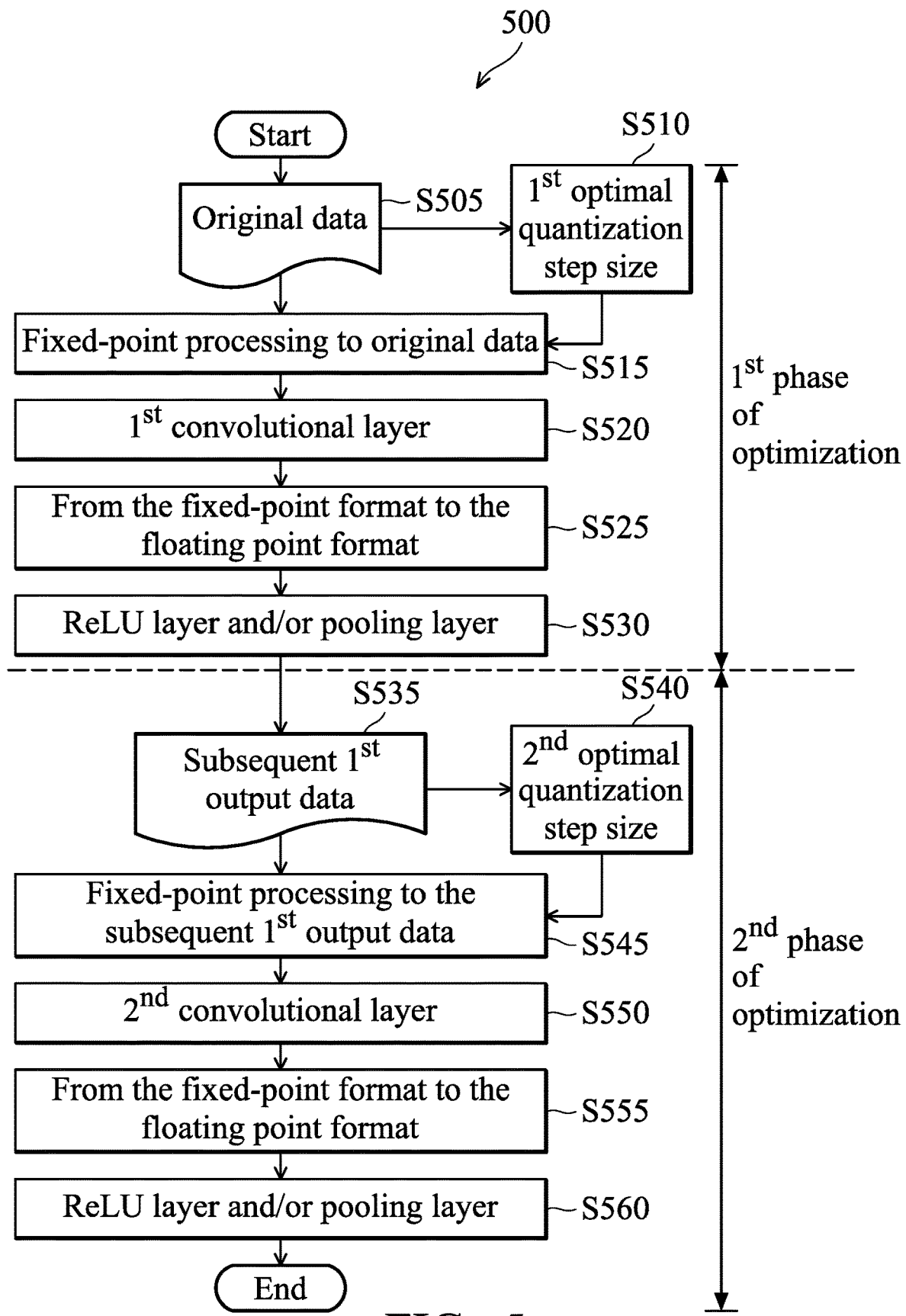
FIG. 5 is a flow diagram illustrating a data input into a convolutional neural network according to an embodiment of the disclosure.

FIG. 5 is a flow diagram 500 illustrating data input into a convolutional neural network according to an embodiment of the disclosure. As shown in FIG. 5, in step S505, the original data is input to the convolutional neural network, wherein the original data may be some floating point numbers. In some embodiments, the original data may include original image data, original weight data, and/or original bias data. In step S510, the computing device may determine a first optimal quantization step size according to a distribution of the original data. In some embodiments, the first optimal quantization step size may be determined according to the distribution of the original image data of the original data. In step S515, the computing device determines the fixed-point format of the original data according to the first optimal quantization step size, and then performs the fixed-point processing to the original data to obtain the first data. In some embodiments, the original image data, original weight data, and/or original bias data of the original data may also have different first optimal quantization step sizes, and thus they may have different fixed-point formats. In step S520, the computing device inputs the fixed original data to the first convolutional layer and outputs first output data. In step S525, the computing device converts the data format of the first output data from the fixed-point format to the floating point format. In step S530, the computing device inputs the first output data after fixed-point processing to the ReLU layer and/or the pooling layer to obtain a subsequent first output data. The first phase of optimization is completed.

In step S535, the computing device uses the subsequent first output data as an input of the second phase of optimization. In step S540, the computing device may determine a second optimal quantization step size according to the distribution of the subsequent first output data. In step S545, the computing device performs fixed-point processing to the subsequent first output data according to the optimal optimum quantization step size to generate second image data. In step S550, the computing device inputs the second image data to the second convolutional layer to output a second output data. The input of the second convolutional layer may further include a second weight data and/or a second bias data. In some embodiments, fixed-point processing may be performed to the second weight data and/or the second bias data, and the optimal quantization step size for performing fixed-point processing may be the same as the second optimal quantization step size. That is, an optimal quantization step size can be obtained according to the second output data, the second weight data and/or the second bias data without fixed-point processing, and the optimal quantization step size is the second optimal quantization step size. In some embodiments, the optimal quantization step size used for the fixed-point processing to the second weight data and/or the second bias data may be different from the second optimal quantization step size. In other words, the optimal quantization step size obtained according to the second weight data and/or the second bias data without fixed-point processing is different from the second optimal quantization step size. In an embodiment, the second weight data and/or the second bias data may be data without fixed-point processing. In step S555, the computing device converts the data format of the second output data from the fixed-point format to the floating point format. In step S560, the computing device inputs the second output data after fixed-point processing to the ReLU layer and/or the pooling layer. The second phase of optimization is completed.

It should be noted that although FIG. 5 only illustrates two phases of optimization process, the subsequent optimization process may be performed until the last layer of the convolutional neural network. In some embodiments, optimization process may be performed to some layers of convolutional neural network, while optimization process may be not performed to other layers of convolutional neural network. In some embodiments, the first phase of optimization may not start from the first layer of convolutional neural network, for example, the first phase of optimization may start from the second layer of convolutional neural network.

Figure 6:
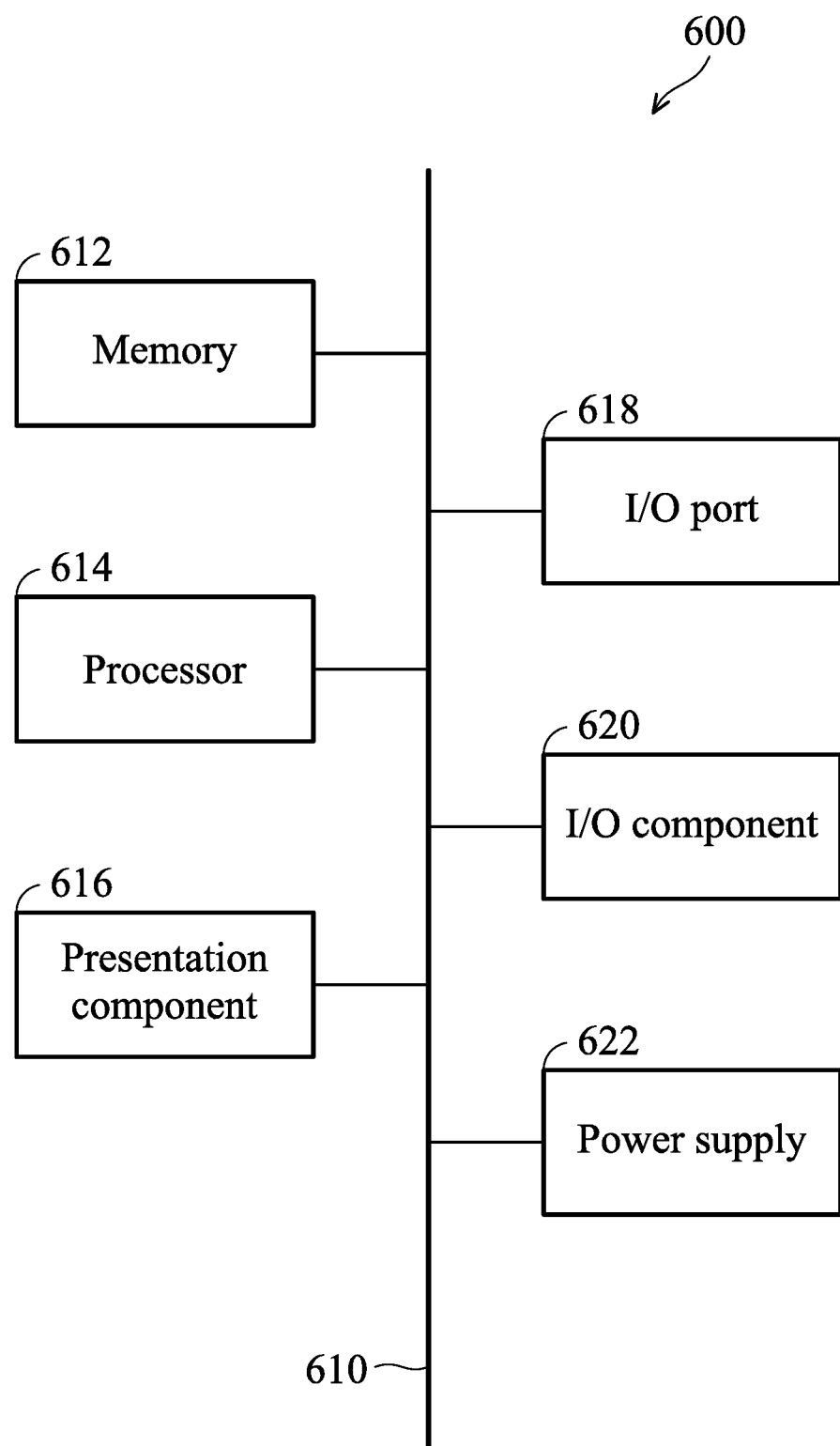
FIG. 6 is a flow diagram illustrating an exemplary operating environment according to an embodiment of the disclosure.

Having described embodiments of the present disclosure, an exemplary operating environment in which embodiments of the present disclosure may be implemented is described below. Referring to FIG. 6, an exemplary operating environment for implementing embodiments of the present disclosure is shown and generally known as a computing device 600. The computing device 600 is merely an example of a suitable computing environment and is not intended to limit the scope of use or functionality of the disclosure. Neither should the computing device 600 be interpreted as having any dependency or requirement relating to any one or combination of components illustrated.

The disclosure may be realized by means of the computer code or machine-useable instructions, including computer-executable instructions such as program modules, being executed by a computer or other machine, such as a personal data assistant or other handheld device. Generally, program modules may include routines, programs, objects, components, data structures, etc., and refer to code that performs particular tasks or implements particular abstract data types. The disclosure may be implemented in a variety of system configurations, including hand-held devices, consumer electronics, general-purpose computers, more specialty computing devices, etc. The disclosure may also be implemented in distributed computing environments where tasks are performed by remote-processing devices that are linked by a communication network.

With reference to FIG. 6, the computing device 600 may include a bus 610 that directly or indirectly couples to the following devices: one or more memories 612, one or more processors 614, one or more display components 616, one or more input/output (I/O) ports 618, one or more input/output components 620, and an illustrative power supply 622. The bus 610 may represent one or more kinds of busses (such as an address bus, data bus, or any combination thereof). Although the various blocks of FIG. 6 are shown with lines for the sake of clarity, in reality, the boundaries of the various components are not specific. For example, the display component 616 such as a display device may be considered an I/O component and the processor 614 may include a memory.

The computing device 600 typically includes a variety of computer-readable media. The computer-readable media can be any available media that can be accessed by computing device 600 and includes both volatile and nonvolatile media, removable and non-removable media. By way of example, but not limitation, computer-readable media may comprise computer storage media and communication media. The computer storage media may include volatile and nonvolatile, removable and non-removable media implemented in any method or technology for storage of information such as computer-readable instructions, data structures, program modules or other data. The computer storage media may include, but not limit to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 600. The computer storage media may not comprise signal per se.

The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, but not limitation, communication media includes wired media such as a wired network or direct-wired connection, and wireless media such as acoustic, RF, infrared and other wireless media or any combination thereof.

The memory 612 may include computer-storage media in the form of volatile and/or nonvolatile memory. The memory may be removable, non-removable, or a combination thereof. Exemplary hardware devices include solid-state memory, hard drives, optical-disc drives, etc. The computing device 600 includes one or more processors that read data from various entities such as the memory 612 or the I/O components 620. The presentation component(s) 616 present data indications to a user or other device. Exemplary presentation components include a display device, speaker, printing component, vibrating component, etc.

The I/O ports 618 allow the computing device 600 to be logically coupled to other devices including the I/O components 620, some of which may be embedded. Illustrative components include a microphone, joystick, game pad, satellite dish, scanner, printer, wireless device, etc. The I/O components 620 may provide a natural user interface (NUI) that processes gestures, voice, or other physiological inputs generated by a user. For example, inputs may be transmitted to an appropriate network element for further processing. A NUI may be implemented to realize speech recognition, touch and stylus recognition, facial recognition, biometric recognition, gesture recognition both on screen and adjacent to the screen, air gestures, head and eye tracking, touch recognition associated with displays on the computing device 600, or any combination of. The computing device 600 may be equipped with depth cameras, such as stereoscopic camera systems, infrared camera systems, RGB camera systems, any combination of thereof to realize gesture detection and recognition. Furthermore, the computing device 600 may be equipped with accelerometers or gyroscopes that enable detection of motion. The output of the accelerometers or gyroscopes may be provided to the display of the computing device 600 to carry out immersive augmented reality or virtual reality.

Furthermore, the processor 614 in the computing device 600 can execute the program code in the memory 612 to perform the above-described actions and steps or other descriptions herein.

It should be understood that any specific order or hierarchy of steps in any disclosed process is an example of a sample approach. Based upon design preferences, it should be understood that the specific order or hierarchy of steps in the processes may be rearranged while remaining within the scope of the present disclosure. The accompanying method claims present elements of the various steps in a sample order, and are not meant to be limited to the specific order or hierarchy presented.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the disclosure has been described by way of example and in terms of the preferred embodiments, it is to be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method executed by a processor, the method operative to quantize input data of each convolutional layer in a convolutional neural network, the method comprising:
   receiving data to be quantized;
   calculating a quantization parameter according to a distribution of the data to be quantized;
   iteratively calculating an optimal quantization step size according to the quantization parameter and the data to be quantized; and
   quantizing the data to be quantized according to the optimal quantization step size to obtain quantization data,
   wherein the step of calculating the quantization parameter according to the distribution of the data to be quantized further comprises:
   calculating a mean and a variance for the distribution; and
   calculating the quantization parameter according to the mean, the variance and a bit length,
   wherein the step of iteratively calculating the optimal quantization step size according to the quantization parameter and the data to be quantized further comprises:
   iteratively obtaining the optimal quantization step size according to a quantization error function including the quantization parameter and the data to be quantized,
   wherein quantization error function is expressed by the following equation:

$$E = \frac{1}{2}\sum_{i=1}^{N}(Q(x_i)-x_i)^2 = \frac{1}{2}\sum_{i=1}^{N}(\Delta \cdot g(x_i)-x_i)^2 = \frac{1}{2}\sum_{i=1}^{N}(\Delta \cdot z_i - x_i)^2$$

where $Q(x_i)$ is the quantization data, $x_i$ is the data to be quantized, N is the number of $X_i$, and $\Delta$ is the optimal quantization step size;
   where the relationship between a quantization level M and a bit length $\omega$ of the data to be quantized is $M \leq 2^\omega$, and the quantization level M can be selected as an odd or even number;
   where when a quantization level M is even, $g(x_i)$ is expressed as:

$$g(x_i) = \text{slop}(x_i) \cdot \min\left\{\text{floor}\left(\frac{|x_i|}{\Delta}\right) + 0.5, \frac{M-1}{2}\right\};$$

when the quantization level M is odd, $g(x_i)$ is expressed as:

$$g(x_i) = \text{slop}(x_i) \cdot \min\left\{\text{floor}\left(\frac{|x_i|}{\Delta} + 0.5\right), \frac{M-1}{2}\right\};$$

$$\text{slop}(x_i) = \begin{cases} 1, & x_i \geq 0 \\ -1, & x_i < 0 \end{cases};$$

where $\text{slop}(x_i)$ is expressed as
   wherein the method further comprises: receiving original data using the method;
   determining a first optimal quantization step size according to a distribution of the original data;
   performing fixed-point processing to the original data according to the first optimal quantization step size to generate first data; using the first data as an input to a first layer of the convolutional neural network to generate first output data; determining a second optimal quantization step size according to a distribution of the first output data; performing the fixed-point processing to the first output data according to the second optimal quantization step size to generate second data;
   and inputting the second data into the second layer of the convolutional neural network.

2. The method for data quantization as claimed in claim 1, wherein the step of quantizing the data to be quantized to obtain the quantization data according to the optimal quantization step size further comprises:
   determining the fixed-point format of the data to be quantized according to the optimal quantization step size, wherein the fixed-point format includes a number of bits for a sign part, a number of bits for an integer part and a number of bits for a fraction part.

3. The method for data quantization as claimed in claim 2, wherein the number of bits for an integer part is m, the number of bits for a fraction part is n, wherein m and n are expressed as:

$m = \log_2((M-1) \times \Delta/2),$ $n = -\log_2(\Delta),$ where M is a quantization level and $\Delta$ is the optimal quantization step size.

4. The method for data quantization as claimed in claim 2, wherein the number of bits for an integer part is m, the number of bits for a fraction part is n, wherein m and n are expressed as:

$m \times P - 1 - n,$ $n = -\log_2(\Delta\min),$ where P is a number of bits of the data to be quantized and Amin is the optimal quantization step size.

5. The method for data quantization as claimed in claim 2, wherein the number of bits for an integer part is m, and the number of bits for a fraction part is n, wherein m and n are expressed as:

$m = \log_2(\max|Q_o|,|Q_M|),$ $n = -\log_2(\Delta),$ where $Q_o$ is an initial quantization position, $Q_M$ is a final quantization position and $\Delta$ is the optimal quantization step size.

6. The method for data quantization as claimed in claim 1, wherein the input data of each convolutional layer in the convolutional neural network includes image data, weight data and/or bias data, wherein the image data is quantized by a uniform quantization method, and the weight data and/or the bias data are/is quantized using a non-uniform quantization method.

7. A device configured to quantize input data of each convolutional layer in a convolutional neural network, comprising:
   one or more processors; and
   one or more computer storage media for storing one or more computer-readable instructions to drive the processors to execute the following tasks:
   receiving data to be quantized;
   calculating a quantization parameter according to a distribution of the data to be quantized;

iteratively calculating an optimal quantization step size according to the quantization parameter and the data to be quantized; and quantizing the data to be quantized according to the optimal quantization step size to obtain quantization data, wherein calculating the quantization parameter according to the distribution of the data to be quantized further comprises:

calculating a mean and a variance for the distribution; and calculating the quantization parameter according to the mean, the variance and a bit length, wherein iteratively calculating the optimal quantization step size according to the quantization parameter and the data to be quantized further comprises:

iteratively obtaining the optimal quantization step size according to a quantization error function including the quantization parameter and the data to be quantized, wherein quantization error function is expressed by the following equation:

$$E = \frac{1}{2}\sum_{i=1}^{N}(Q(x_i)-x_i)^2 = \frac{1}{2}\sum_{i=1}^{N}(\Delta \cdot g(x_i)-x_i)^2 = \frac{1}{2}\sum_{i=1}^{N}(\Delta \cdot z_i - x_i)^2$$

where $Q(x_i)$ is the quantization data, $x_i$ is the data to be quantized, N is the number of $x_i$, and $\Delta$ is the optimal quantization step size;

where the relationship between a quantization level M and a bit length $\omega$ of the data to be quantized is $M \leq 2^\omega$, and the quantization level M can be selected as an odd or even number;

where when a quantization level M is even, g(x) is expressed as:

$$g(x_i) = \text{slop}(x_i) \cdot \min\left\{\text{floor}\left(\frac{|x_i|}{\Delta}\right) + 0.5, \frac{M-1}{2}\right\};$$

when the quantization level M is odd, $g(x_i)$ is expressed as:

$$g(x_i) = \text{slop}(x_i) \cdot \min\left\{\text{floor}\left(\frac{|x_i|}{\Delta} + 0.5\right), \frac{M-1}{2}\right\};$$

$$\text{slop}(x_i) = \begin{cases} 1, & x_i \geq 0 \\ -1, & x_i < 0 \end{cases};$$

where $\text{slop}(x_i)$ is expressed as wherein the device is further configured for: receiving original data using the device;

determining a first optimal quantization step size according to a distribution of the original data;

performing fixed-point processing to the original data according to the first optimal quantization step size to generate first data; using the first data as an input to a first layer of the convolutional neural network to generate first output data; determining a second optimal quantization step size according to a distribution of the first output data; performing the fixed-point processing to the first output data according to the second optimal quantization step size to generate second data;

and inputting the second data into the second layer of the convolutional neural network.

8. The device for data quantization as claimed in claim 7, wherein quantizing the data to be quantized to obtain the quantization data according to the optimal quantization step size further comprises:

determining the fixed-point format of the data to be quantized according to the optimal quantization step size, wherein the fixed-point format includes a number of bits for a sign part, a number of bits for an integer part and a number of bits for a fraction part.

9. The device for data quantization as claimed in claim 8, wherein the number of bits for an integer part is m, and the number of bits for a fraction part is n, wherein m and n are expressed as:

$$m = \log_2((M-1) \times \Delta/2),$$

$$n = -\log_2(\Delta),$$

where M is a quantization level and $\Delta$ is the optimal quantization step size.

10. The device for data quantization as claimed in claim 8, wherein the number of bits for an integer part is m, the number of bits for a fraction part is n, wherein m and n are expressed as:

$$m = P-1-n,$$

$$n = -\log_2(\Delta \min),$$

where P is a number of bits of the data to be quantized and $\Delta$ min is the optimal quantization step size.

11. The device for data quantization as claimed in claim 8, wherein the number of bits for an integer part is m, and the number of bits for a fraction part is n, wherein m and n are expressed as:

$$m = \log_2(\max|Q_o|,|Q_M|),$$

$$n = -\log_2(\Delta),$$

where $Q_o$ is an initial quantization position, $Q_M$ is a final quantization position and $\Delta$ is the optimal quantization step size.

12. The device for data quantization as claimed in claim 7, wherein the input data of each convolutional layer in the convolutional neural network includes image data, weight data and/or bias data, wherein the image data is quantized by a uniform quantization method, and the weight data and/or the bias data are/is quantized using a non-uniform quantization method.

* * * * *